F. L. ATHERTON.
SPOOLING MACHINE.
APPLICATION FILED OCT. 25, 1913.
1,163,499.
Patented Dec. 7, 1915.
8 SHEETS—SHEET 1.
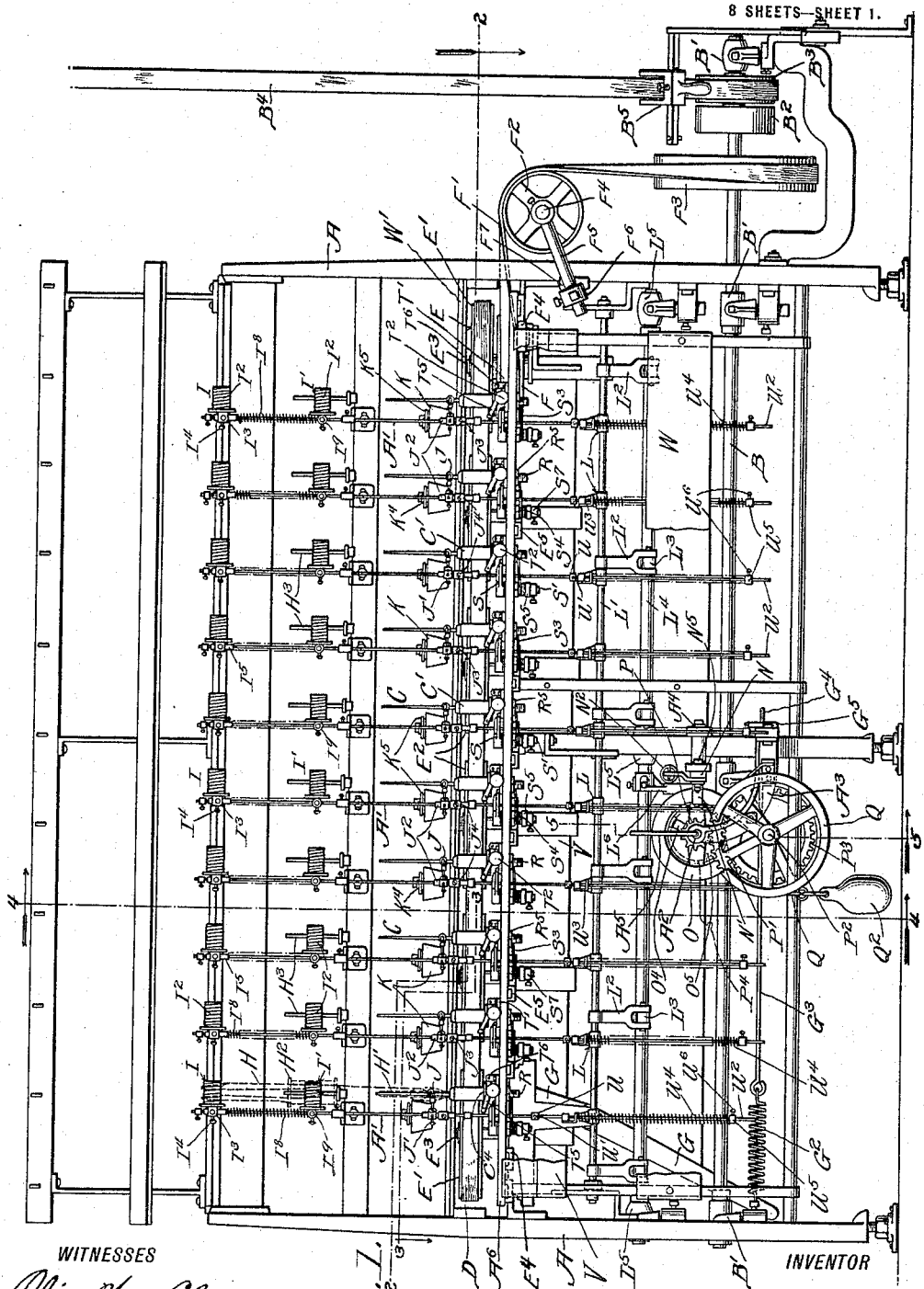
WITNESSES
INVENTOR
Frederick L. Atherton
ATTORNEYS

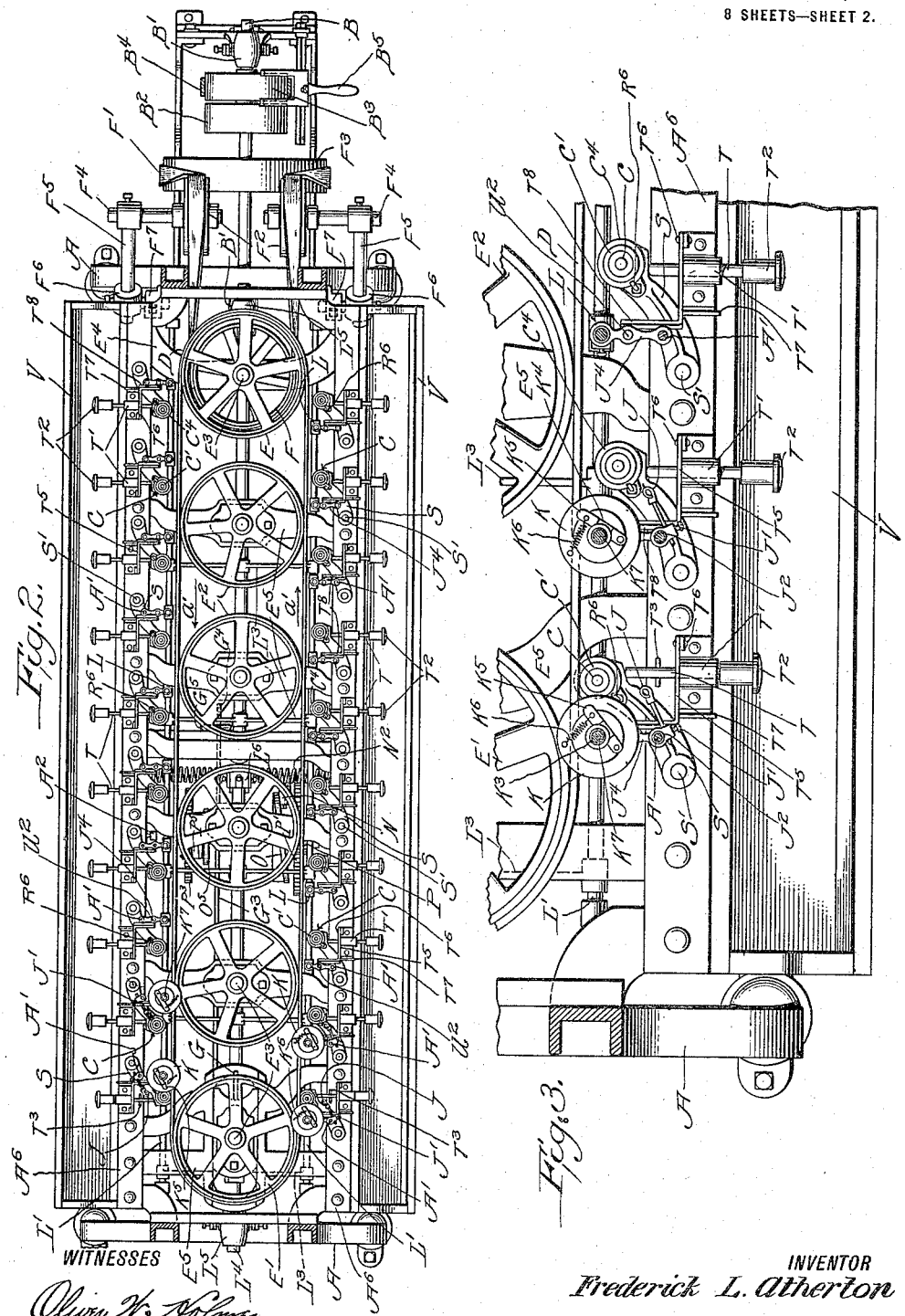

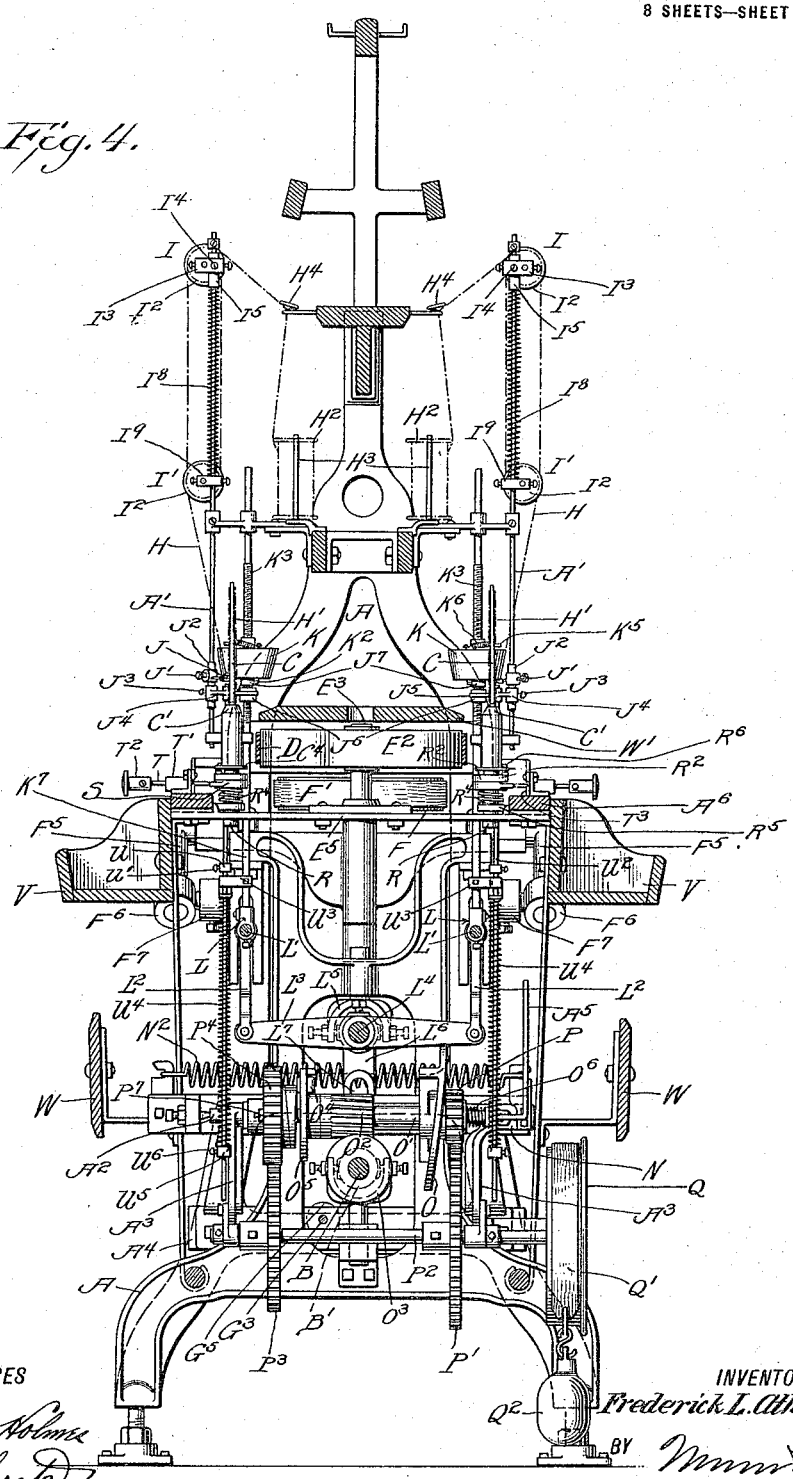

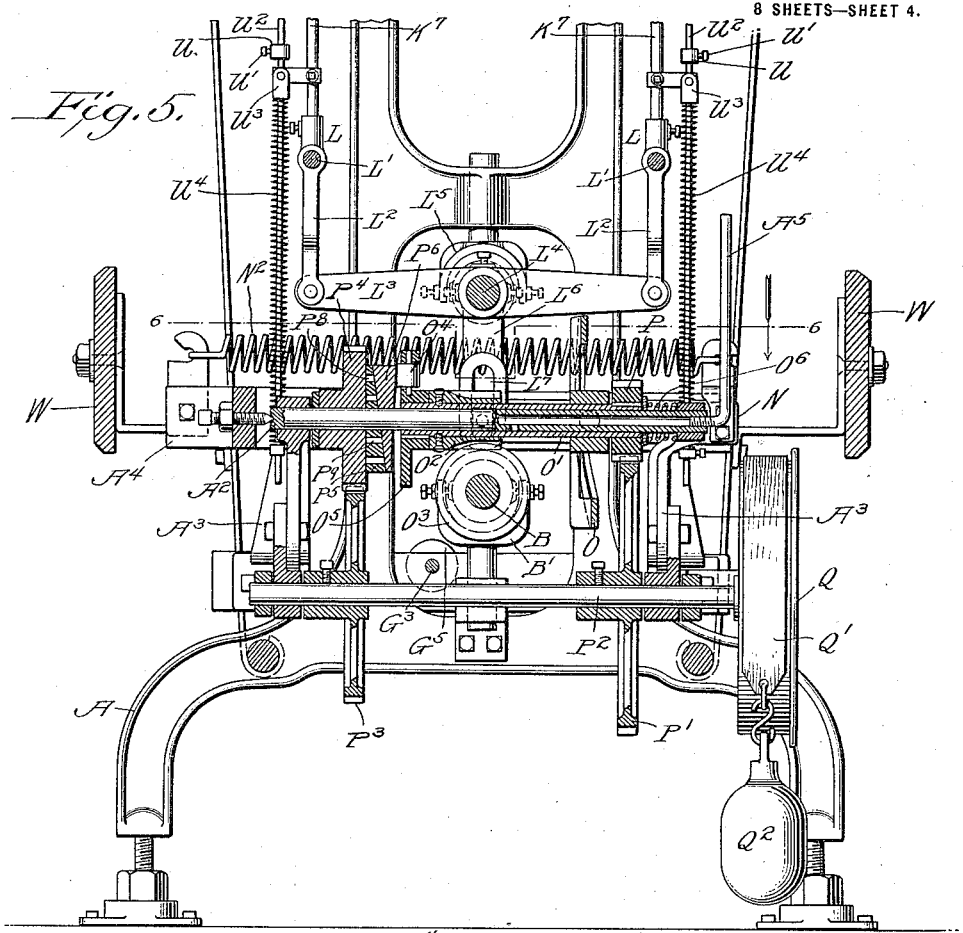
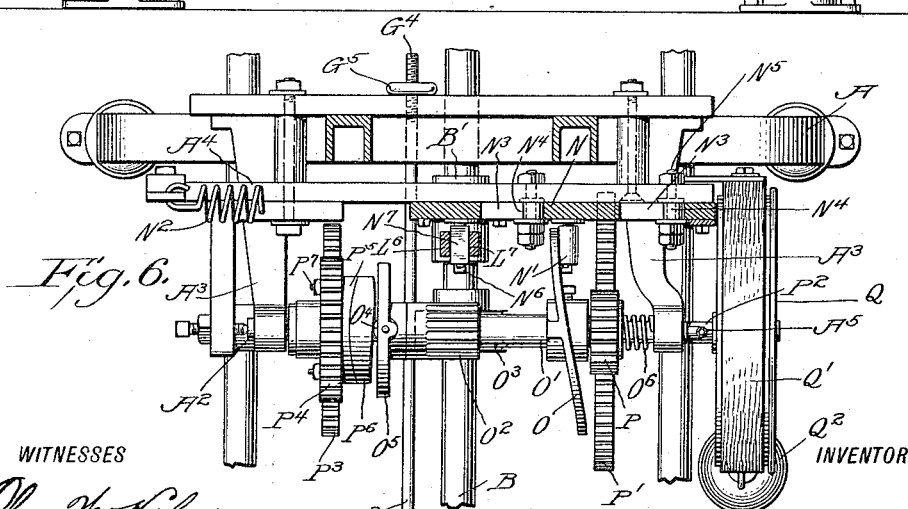

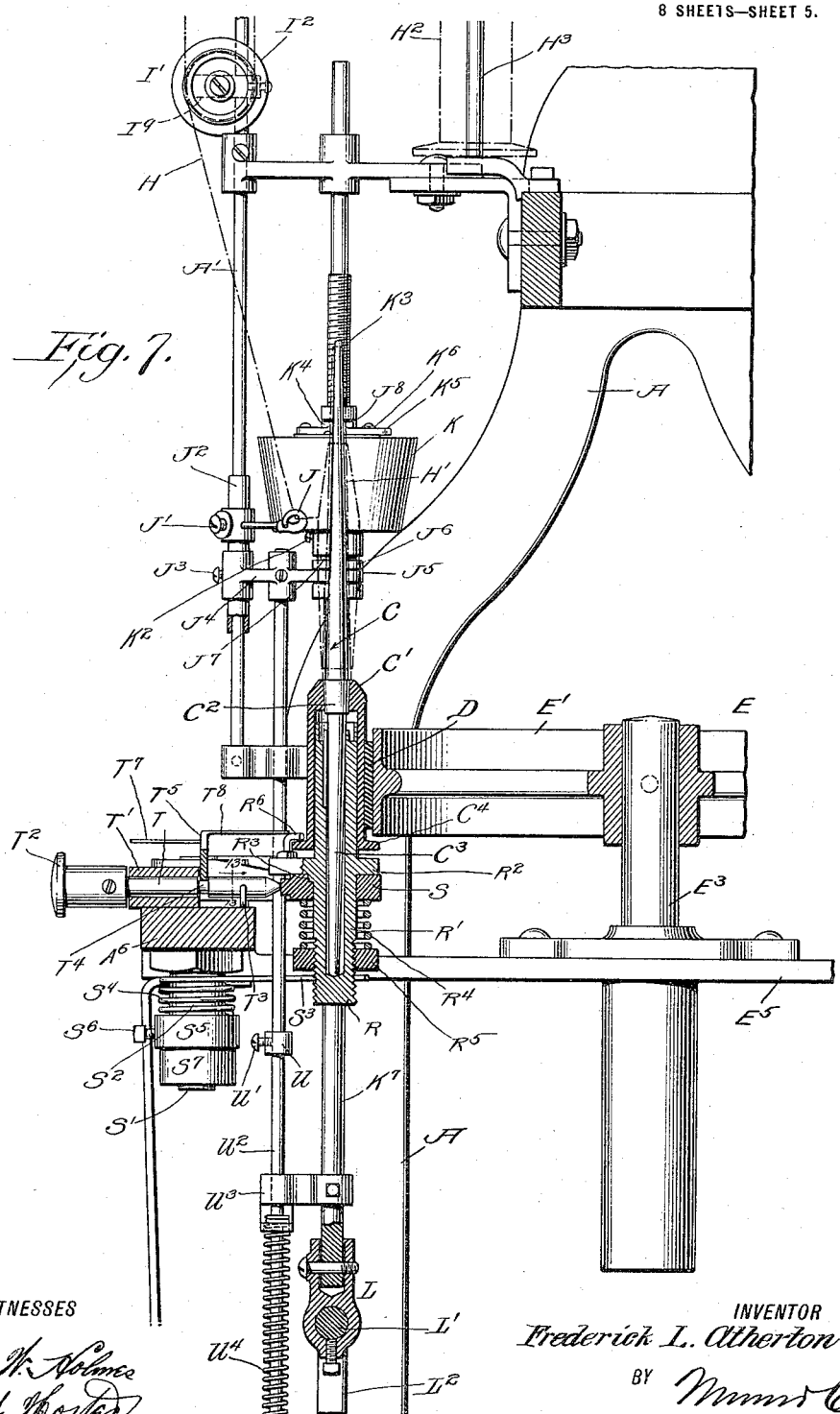

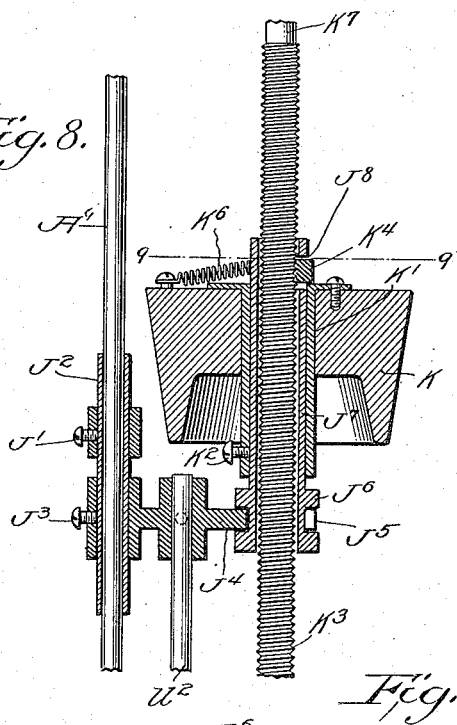

F. L. ATHERTON.
SPOOLING MACHINE.
APPLICATION FILED OCT. 25, 1913.
1,163,499.
Patented Dec. 7, 1915.
8 SHEETS—SHEET 7.
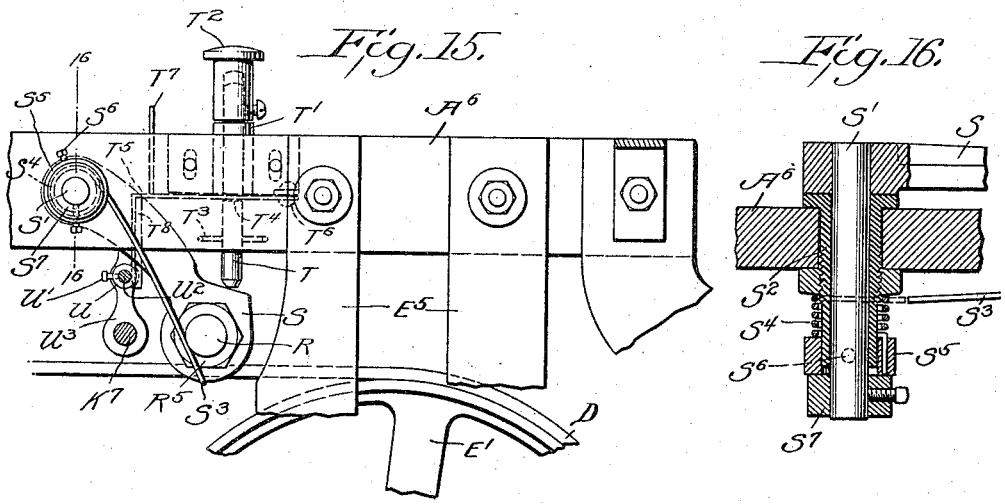
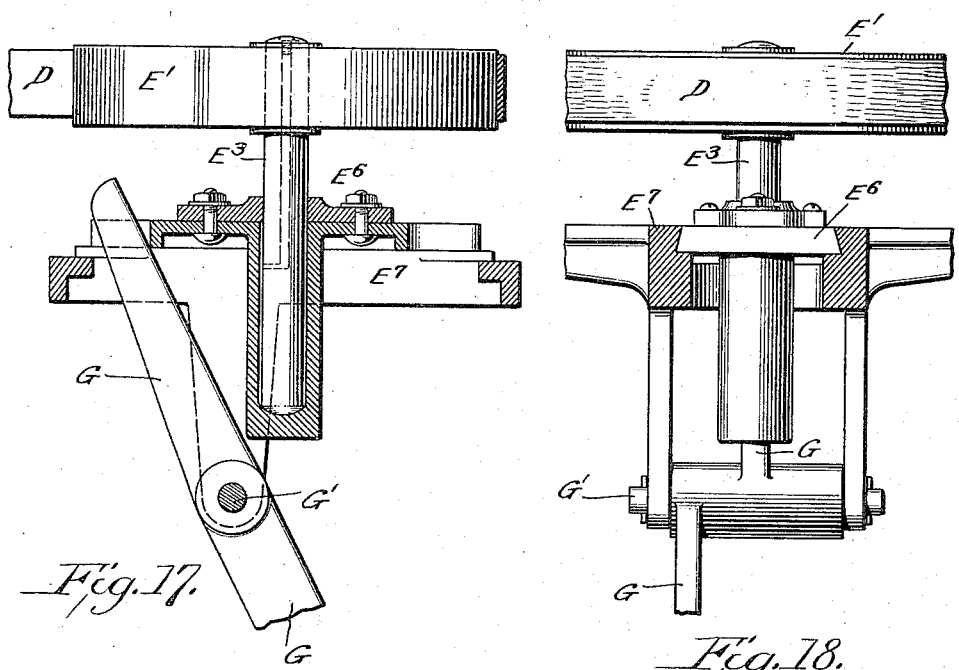
WITNESSES
INVENTOR
Frederick L. Atherton
BY
ATTORNEYS

F. L. ATHERTON.
SPOOLING MACHINE.
APPLICATION FILED OCT. 25, 1913.

1,163,499.

Patented Dec. 7, 1915.
8 SHEETS—SHEET 8.

WITNESSES

INVENTOR
Frederick L. Atherton
BY
ATTORNEYS

UNITED STATES PATENT OFFICE.

FREDERICK L. ATHERTON, OF PATERSON, NEW JERSEY.

SPOOLING-MACHINE.

1,163,499.   Specification of Letters Patent.   Patented Dec. 7, 1915.

Application filed October 25, 1913. Serial No. 797,236.

*To all whom it may concern:*

Be it known that I, FREDERICK L. ATHERTON, a citizen of the United States, and a resident of Paterson, in the county of Passaic and State of New Jersey, have invented a new and Improved Spooling-Machine, of which the following is a full, clear, and exact description.

The invention relates to spooling machines used for spooling silk and other threads on quills for use in loom shuttles.

The object of the invention is to provide a new and improved spooling machine arranged to permit of running the quill or spool-carrying spindle at a high rate of speed to wind the thread on the quill or spool with a view to prevent the thread from sloughing when the quill or spool is used in a loom shuttle, to insure winding of the thread on the quill or spool with uniform tension and to automatically stop the spindle as soon as the quill or spool is filled with the desired amount of thread.

In order to accomplish the desired result use is made of a revoluble spindle adapted to carry a quill, spool, bobbin or the like and a thread delivery device for delivering the thread to the said quill and having a reciprocating movement in the direction of the length of the spindle, the said thread delivery device being provided with feeding mechanism for imparting a bodily movement to the delivery device, the said feeding mechanism receiving periodical movement by contact with the thread passing from the delivery device onto the quill. Use is further made of means for imparting an irregular reciprocating movement to the delivery device and to the feeding mechanism with a view to wind the threads in such a manner onto the quill to prevent sloughing of the thread when the filled quill is used in a loom shuttle.

A practical embodiment of the invention is represented in the accompanying drawings forming a part of this specification, in which similar characters of reference indicate corresponding parts in all the views.

Figure 19:
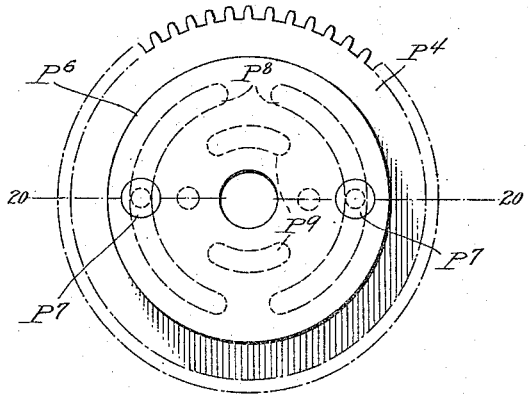
Figure 21:
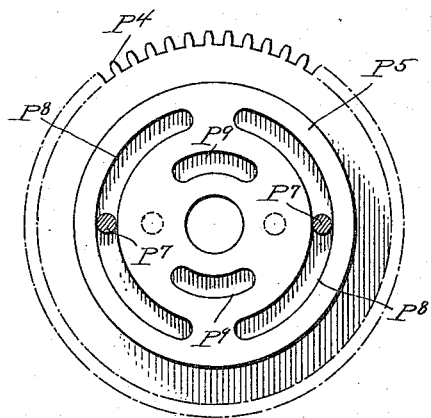
Figure 20:
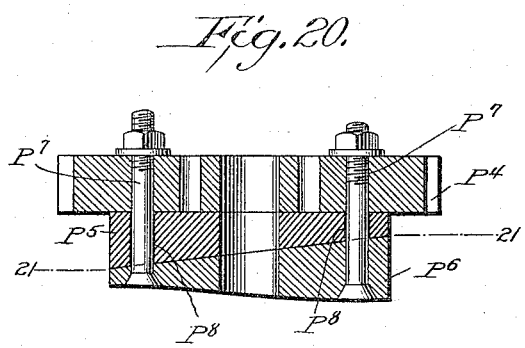
Figure 22:
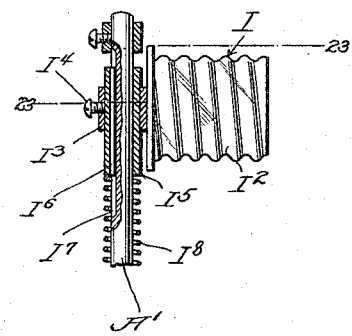
Figure 23:
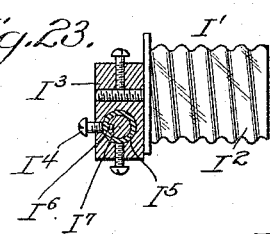

Figure 1 is a side elevation of the spooling machine with parts broken out; Fig. 2 is a sectional plan view of the same on the line 2—2 of Fig. 1; Fig. 3 is an enlarged sectional plan view of part of the spooling machine, the section being on the line 3—3 of Fig. 1; Fig. 4 is an enlarged cross section of the spooling machine on the line 4—4 of Fig. 1; Fig. 5 is an enlarged cross section of the same on the line 5—5 of Fig. 1; Fig. 6 is a sectional plan view of the same on the line 6—6 of Fig. 5; Fig. 7 is an enlarged cross section of one of the spooling devices and adjacent parts, the section being on the line 7—7 of Fig. 1; Fig. 8 is an enlarged cross section of the feed mechanism for the thread delivery device; Fig. 9 is a sectional plan view of the same on the line 9—9 of Fig. 8; Fig. 10 is a face view of the reciprocating slide; Fig. 11 is an enlarged vertical section of the same on the line 11—11 of Fig. 10; Fig. 12 is an enlarged central section of one of the fixed tension spools; Fig. 13 is a sectional side elevation of the means for holding the locking bolt for the spindle-carrying arm against turning; Fig. 14 is a perspective view of the half nut of the feeding mechanism for the delivery device; Fig. 15 is an enlarged inverted plan view of part of the spooling device and showing more particularly one of the spindles and the means for holding the pulley of the spindle in running contact with the driving belt; Fig. 16 is an enlarged vertical section of the spindle-carrying arm, the section being on the line 16—16 of Fig. 15; Fig. 17 is an enlarged sectional side elevation of the bearing for the tightening pulley of the spindle-driving belt; Fig. 18 is a cross section of the same; Fig. 19 is an enlarged face view of the auxiliary cams; Fig. 20 is a sectional plan view of the same on the line 20—20 of Fig. 19; Fig. 21 is a sectional face view of the same on the line 21—21 of Fig. 20; Fig. 22 is an enlarged side elevation of one of the yielding tension spools with parts in section; and Fig. 23 is a sectional plan view of the same on the line 23—23 of Fig. 22.

The improved spooling machine is mounted on a suitably constructed frame A supporting bearings B′ in which is journaled a main shaft B extending lengthwise of the machine. The main shaft B is provided at one end (see Figs. 1 and 2) with loose and fast pulleys $B^2$, $B^3$ connected by a belt $B^4$ with other machinery, and the said belt $B^4$ is engaged by a belt shifter $B^5$ to permit the attendant of the machine to shift the belt B⁴ from the loose pulley B² onto the fast pulley B³ or vice versa with a view to start and stop the machine whenever desired.

The spooling machine, as shown in the drawings, is provided with a series of twenty vertically-disposed spindles C, ten on each side of the machine, each spindle C being attached to a pulley C' (see Fig. 7), and the several pulleys C' are adapted to be driven by frictional contact with a single endless belt D passing around end pulleys E, E' and over a series of intermediate pulleys E² (see Figs. 1 and 2). The end pulley E is secured on the upper end of a vertically-disposed shaft E³ journaled in a bearing E⁴ attached to one end of the main frame A, and on the said shaft E³ is secured a pulley F around which passes a belt F', the runs of which pass over guide pulleys F² to finally pass around a pulley F³ secured on the main shaft B so that when the latter is running a rotary motion is transmitted by the means just described to the shaft E³ and the pulley E to cause the belt D to travel in the direction of the arrow a' indicated in Fig. 2. Each of the guide pulleys F² above mentioned is mounted to rotate loosely on a transverse rod F⁴ adjustably secured to an arm F⁵ adjustably secured in a bearing F⁶, and the said bearing F⁶ is adjustably secured in a bearing F⁷ attached to the main frame A. By the arrangement described the pulleys F² can be adjusted so as to give the desired tension to the belt F' and to properly guide the runs of the belt F' from the pulley F to the pulley F³. The intermediate pulleys E² are journaled in suitable bearings E⁵ attached to the main frame A, and the end pulley E' is journaled in a bearing E⁶ (see Figs. 17 and 18) mounted to slide in a suitable guideway E⁷ arranged on the main frame A. The bearing E⁶ is pressed on by the upper end of a lever G fulcrumed at G' on the main frame A and pressed on by a spring G² attached to a rod G³ (see Fig. 1) having a threaded end G⁴ in which screws a wheel nut G⁵ abutting against the main frame A to permit of adjusting the tension of the spring G² with a view to cause the lever G to press the bearing E⁶ outward with more or less force to give the desired tension to the belt D.

The spooling devices for the several spindles C are alike in construction and hence it suffices to describe but one in detail. The thread H to be wound on a quill H' or like device held on the spindle C unwinds from a spool H² held loosely on a spool holder H³ attached to the upper portion of the main frame A, as plainly indicated in Fig. 4. The thread H after unwinding from the spool H² passes through a guide H⁴ held on the main frame A, and then the thread passes successively around tension spools I, I' and finally through an eye J forming part of a thread delivery device presently to be described in detail, the thread H passing from the eye J to the quill H' rotating with the corresponding spindle C. The eye J is adjustably secured by a set screw J' to a sleeve J² mounted to slide up and down on a guide rod A' fixed on the main frame A (see Figs. 4, 7 and 8) and on the said sleeve J² is adjustably secured by a set screw J³ an arm J⁴ engaging an annular groove J⁵ in a collar J⁶ formed on a sleeve J⁷ adjustably secured in a bushing K' of a feed member K in the form of an inverted frustum of a cone. The sleeve J⁷ is secured in the bushing K' by a set screw K² and through the said sleeve J⁷ extends loosely a screw rod K³ adapted to be engaged by a half nut K⁴ formed on a lever K⁵ pivoted on the top of the bushing K', as plainly indicated in Fig. 9 (see also Fig. 14). The lever K⁵ is pressed on by a spring K⁶ to normally hold the half nut K⁴ in engagement with the screw rod K³. The sleeve J⁷ is provided near its upper end with a cut-out portion J⁸ to accommodate the lever K⁵ and its half nut K⁴, one side wall of the cut-out portion J⁸ forming a stop for the said lever K⁵, as will be readily understood by reference to Fig. 9. Now on adjusting the sleeve J⁷ in the bushing K' after loosening the set screw K² the half nut K⁴ can be adjusted to properly engage the threads of the screw rod K³ without causing undue friction. After the desired adjustment is made the set screw K² is screwed up to fasten the sleeve J⁷ in place.

The screw rod K³ is irregularly reciprocated in the direction of its length by an actuating mechanism presently to be described in detail. The lower non-threaded portion K⁷ of the screw rod K³ is pivotally connected to a head L attached to a longitudinally-extending rod L' which accommodates all the heads L for the different screw rods K³ on the corresponding side of the spooling machine. Each of the rods L' is connected by a number of links L² with arms L³ extending transversely from a rock shaft L⁴ extending lengthwise of the machine and journaled in suitable bearings L⁵ held on the main frame A. It is understood that arms L³ extend from the rock shaft L⁴ in opposite directions to connect by the links L² with the two rods L' on opposite sides of the machine, as will be readily understood by reference to Fig. 4. The rock shaft L⁴ is provided with a depending arm L⁶ connected with a transversely-extending slide N carrying a friction roller N' engaging a face cam O (see Figs. 4, 5, 6 and 10) secured on a sleeve O' mounted to turn and to slide on a transversely-extending guideway or rod A² supported on brackets A³ attached to or forming part of the main frame A. On the sleeve O' is secured a worm O² in mesh with a worm wheel O³ secured on the main shaft B so that when the machine is running and the shaft B is rotated then a rotary motion is transmitted by the worm wheel O³ and the worm O² to the sleeve O' and its cam O for the latter to impart a reciprocating motion to the slide N. The slide N is pressed on by a spring N² to normally hold the friction roller N' in contact with the face of the cam O. The slide N is provided with lengthwise-extending slots N³ (see Figs. 10 and 11) through which extend guide blocks N⁴ held on bolts N⁵ attached to a cross bar A⁴ forming part of the main frame A. The slide N is also provided with a pin N⁶ carrying a block N⁷ extending into a slot L⁷ formed in the lower end of the depending arm L⁶ so that when a sliding motion is given to the slide N by the action of the cam O and the friction roller N' then a transverse swinging motion is given to the arm L⁶ to rock the shaft L⁴. The rocking motion given to the shaft L⁴ is transmitted by the arms L³, links L², rods L' and heads L to the screw rods K³ to reciprocate the same, it being understood that when the machine is running the screw rods K³ on the opposite sides of the machine reciprocate up and down alternately in opposite directions, that is, when the screw rods on one side of the machine move upward the screw rods on the other side of the machine move downward and vice versa.

The mechanism just described would impart a regular reciprocating motion to each of the screw rods K³, but in order to wind the thread H on the quill H' in such a manner that the thread is prevented from sloughing, an irregular reciprocating motion is given to the screw rods, and for this purpose the following arrangement is made: On the sleeve O' is secured a pinion P in mesh with a gear wheel P' secured on a counter-shaft P² journaled in suitable bearings arranged on the brackets A³ (see Figs. 4, 5 and 6). On the counter-shaft P² is secured a gear wheel P³ in mesh with a gear wheel P⁴ mounted to rotate loosely on the rod A², and on the face of this gear wheel P⁴ are secured cam sections P⁵, P⁶ by the use of bolts P⁷ held on the gear wheel P⁴. The cam sections P⁵, P⁶ form an adjustable cam and the outer face of the section P⁶ is engaged by a friction roller O⁴ journaled on a disk O⁵ secured on the sleeve O' adjacent the worm O², as plainly shown in Figs. 5 and 6. When the machine is running and a rotary motion is given to the sleeve O' as previously explained then the gear wheels P, P' rotate the counter-shaft P² and the rotary motion of the latter is transmitted by the gear wheels P³, P⁴ to the cam formed of the sections P⁵, P⁶, so that a reciprocating motion is given by the friction roller O⁴ and the disk O⁵ to the sleeve O' which carries the cam O whereby the latter is bodily shifted in the direction of its axis. As the friction roller N' of the slide N is held in contact with the face of the cam O by the action of the spring N² it is evident that the friction roller O⁴ is likewise held in contact with the face of the cam section P⁶ owing to the fact that the disk O⁵ carrying the said friction roller O⁴ is attached to the sleeve O' which in turn carries the cam O. The outer face of the cam section P⁶ is irregular and the cam sections P⁵, P⁶ are approximately wedge-shaped, as indicated in Fig. 20, and the bolts P⁷ pass through segmental slots P⁸ in the cam section P⁵ to allow of shifting the cam section P⁵ on the said bolts relative to the cam section P⁶ to change the latter relative to the cam O with a view to give more or less throw to the sleeve O' and the cam O in the direction of the axis thereof. The cam section P⁵ is preferably provided with a second set of segmental grooves P⁹ concentric to the grooves P⁸ and adapted to be engaged by the bolts P⁷ to allow of varying the throw of the cam section P⁶ still more whenever it is desired to do so, the cam grooves P⁹ being intermediate the ends of the cam grooves P⁸, as indicated in Fig. 21. A spring O⁶ is preferably coiled on the rod A² and presses on the sleeve O' adjacent the gear wheel P (see Figs. 5 and 6) to assist the spring N² in holding the frictional roller O⁴ in engagement with the face of the cam section P⁶. The spring O⁶ bears against the adjacent bracket A³ previously mentioned. It is understood that by the arrangement described the cam O besides its regular rotary motion receives a bodily irregular reciprocating motion in the direction of its axis and consequently an irregular reciprocating motion is given to the slide N and this motion of the slide N is transmitted by the arm L⁶ to the rock shaft L⁴ so that the latter rocks irregularly and consequently more or less up and down movement is given to the screw rods K³.

In order to prevent backlash of the gearing above described the counter-shaft P² is provided with a brake wheel Q engaged by a brake band Q' secured at one end to the main frame A and supporting at its other end a weight Q² to brake the wheel Q with sufficient force to prevent backlash in the gear wheels P, P', P³ P⁴ and the worm O² and its worm wheel O³ to insure an easy and noiseless running of the machine. One end of the rod A² is hollow and connected with a pipe A⁵ for introducing a lubricant into the hollow end of the rod A² to conduct the lubricant by way of apertures to the sleeve O¹ to lubricate the same, as will be readily understood by reference to Fig. 5.

Each spindle C is provided with a conical portion $C^2$ (see Fig. 7) driven into a corresponding bore in the end of the pulley $C'$, and the said spindle C is provided with a shank $C^3$ extending downward from the conical portion $C^2$ and engaging a recess $R'$ in a pin R on which the pulley $C'$ is mounted to rotate loosely. The pin R is provided with a collar $R^2$ seated on top of an arm S and held against turning thereon by a lug $R^3$ engaging a corresponding notch in the arm S (see Fig. 7). A spring $R^4$ is coiled on the lower portion of the pin R and rests with its upper end on the under side of the arm S while the lower end of the said spring presses against a collar $R^5$ screwing on the lower threaded portion of the pin R so that the collar $R^2$ is held firmly in position on the arm S. The collar $R^2$ is provided with an angular retaining pin $R^6$ engaging the bottom flange $C^4$ of the pulley $C'$ to hold the latter against upward movement (see Fig. 7). The arm S is provided with a pivot pin $S'$ (see Figs. 15 and 16) mounted to turn in a bushing $S^2$ held on the spindle rail $A^6$ forming part of the main frame A. The lower end of the pin R is pressed on by the free end of a spring $S^3$ having a coil $S^4$ wound around the lower end of the bushing $S^2$ and having its terminal attached to a collar $S^5$ secured by a set screw $S^6$ to the lower end of the bushing $S^2$. The collar $S^5$ rests on a collar $S^7$ secured to the lower end of the pivot pin $S'$. By the arrangement described the spring $S^3$ presses with sufficient force on the pin R so as to swing the arm S outwardly and with it the spindle C to move the pulley $C'$ out of engagement with the traveling belt D.

In order to hold the pulley $C'$ in contact with the belt D use is made of a bolt T mounted to slide transversely in a suitable bearing $T'$ arranged on the spindle rail $A^6$ (see Figs. 2, 3, 4, 7 and 15). The outer end of the bolt T is provided with a suitable knob $T^2$ and the inner end of the said bolt T engages the free end of the arm S so that when the knob $T^2$ is pushed inward an inward swinging motion is given to the arm S against the tension of the spring $S^3$ to move the pulley $C'$ in frictional contact with the belt D. When this takes place a rotary motion is transmitted by the belt D to the pulley $C'$ to rotate the spindle C and the quill $H'$ held thereon. The bolt T is held against turning in its bearing $T'$ by a U-shaped rod $T^3$ extending transversely through the bolt and resting with its ends on the rail $A^6$ (see Fig. 13). The bolt T is provided with an annular groove $T^4$ adapted to be engaged by a lever $T^5$ fulcrumed at $T^6$ on the inner edge of the bearing $T'$ (see Figs. 3 and 15). The lever $T^5$ is provided with a handle $T^7$ under the control of the operator, and the said lever is also provided with an angular transversely-extending arm $T^8$ extending into the path of a collar U adjustably secured by a set screw $U'$ on a vertically-disposed rod $U^2$ secured at its upper end to the arm $J^4$ (see Fig. 7) and engaging a bracket $U^3$ attached to the lower end $K^7$ of the screw rod $K^3$. A spring $U^4$ is coiled on the lower end of the rod $U^2$ and its upper end is attached to the bracket $U^3$ while the lower end of the spring $U^4$ is attached to a collar $U^5$ adjustably secured by a set screw $U^6$ on the lower end of the rod $U^2$. The spring $U^4$ is a pull spring and is intended to slightly overbalance the thread delivery device and its feed mechanism, consisting essentially of the feed member K and the parts supported thereby. By this arrangement the feed member K rotates freely on the screw rod $K^3$ so that a light touch of the peripheral face of the feed member K on the portion of the thread wound upon the quill $H'$ at the time is sufficient to impart a rotary motion to the feed member K. The peripheral face of the feed member K touches the thread at the time the feed member K is at the end of its downward stroke so that an intermittent rotary motion is given to the feed member K at every full stroke of the screw rod $K^3$, the feed member K moving bodily up and down with the said screw rod. By adjusting the collar $U^5$ on the rod $U^2$ the tension of the spring $U^4$ can be regulated to overbalance the thread delivery device and its feed mechanism, as above explained. The collar U is adjustable on the rod $U^2$ so that the collar engages the angular arm $T^8$ of the lever $T^5$ sooner or later according to the height of the thread to be wound on the quill $H'$. It is understood that the rod $U^2$ moves upward with the arm $J^4$ and when the collar U imparts an upward swinging movement to the lever $T^5$ then the latter disengages the annular groove $T^4$ and thus unlocks the bolt T to allow the spring $S^3$ to swing the arm S outward with a view to disengage the pulley $C'$ from the belt D. When this takes place the rotation of the spindle C ceases and the quill $H'$ has been filled with the desired amount of thread H and the filled quill can now be removed from the spindle C.

Each of the tension spools I, $I'$ is provided with a spiral groove $I^2$ on which the thread H is wound a number of times according to the nature of the thread, so that the convolutions of the wound portions of the thread are separate one from the other. The tension spool I is provided with a ring $I^3$ adjustably fastened by a set screw $I^4$ to a sleeve $I^5$ mounted to slide on the guide rod $A'$ previously mentioned. The sleeve $I^5$ is provided with a key $I^6$ engaging a keyway $I^7$ formed in the guide rod $A'$ to hold the tension spool I against turning on the guide rod $A'$. The bottom of the sleeve $I^5$ rests on top of a spring $I^8$ coiled on the guide rod A′ and resting with its bottom on a bracket I⁹ secured on the guide rod and to which bracket I⁹ the other lower tension spool I′ is secured. Thus by the arrangement described the upper tension spool I is free to yield in a vertical direction to take up any slack that may exist between the tension spool I and the guide H⁴. It is understood that both tension spools I, I′ are held against rotation and by winding the thread a number of times in the grooves I² it is evident that the desired tension is obtained to prevent any slack in the thread between the tension spool I′ and the eye J. The machine is provided at each side with a trough V for the reception of spools and the like, and the sides of the machine are also provided with guard rails W and a guard rail W′ extends lengthwise above the pulleys E, E′ and E².

The operation is as follows: The attendant of the machine places a quill H′ onto the spindle C at the time the arm S is in outermost position and the spindle is at rest. The attendant now presses the knob T² inward to impart an inward swinging motion to the arm S with a view to engage the pulley C′ with the running belt D to cause the spindle C to rotate. When the knob T² is pushed inward the lever T⁵ drops into the annular groove T⁴ and thus locks the bolt T and the arm S against outward movement. The half nut K⁴ at the beginning of the operation engages the screw rod K³ at such a point that the lower end of the feed member K and the eye J are about opposite the bottom of the quill H′ at the time the screw rod K³ is at the lower end of its down stroke. The attendant attaches the terminal of the thread H in the usual manner to the quill H′ so that the rotating quill winds up the thread and as the screw rod K³ reciprocates in an up and down direction and with it the eye J it is evident that the thread H is fed onto the quill with the convolutions one alongside the other. At the beginning of the operation the upper edge of the feed member K is in close proximity or touches the upper portion of the quill H′ while the lower or smaller end of the feed member K is a distance away from the quill H′, but after some of the thread H has been wound on the lower portion of the quill H′ then the lower end of the feed member K touches the thread at the time the feed member K moves into lowermost position. The contact of the feed member K with the thread is but for an instant but sufficient to give a slight turning motion to the feed member K whereby the half nut K⁴ is caused to screw on the screw rod K³ thus moving the feed member K and the eye J in an upward direction together with the rod U² and its tripping collar U. This operation is repeated at every down stroke of the screw rod K³ and consequently after each full stroke of the screw rod K³ the delivery device and its feeding mechanism have been raised approximately the thickness of the thread H wound on the quill H′ at the time. In the course of the further running of the machine the thread H is wound on the quill H′ and the lower portion of the wound thread is in the form of an inverted frustum of a cone of a height corresponding to the throw of the screw rod K³, while the middle portion of the filled quill H′ is cylindrical and the upper portion is again tapering, and when the quill has been filled to the desired height then the collar U engages the arm T⁸ and finally swings the lever T⁵ upward thus unlocking the bolt T and allowing the arm S to swing outward by the action of the spring S³. The rotation of the spindle C now ceases and the thread H is broken close to the filled quill H′ and the latter is removed from the spindle C and replaced by an empty quill, after which the operator takes hold of the lever K⁵ and swings the same outward to disengage the half nut K⁴ from the screw rod K³ to allow the feed member K and the parts supported thereby to drop back into lowermost position, after which the operator releases the lever K⁵ to allow the spring K⁶ to return the lever K⁵ with a view to reengage the half nut K⁴ with the screw rod K³. The above described operation is then repeated, that is, the operator presses the knob T² inward to reëngage the pulley C′ with the belt D, after which the operator connects the end of the thread H with the empty quill H′.

As previously stated the up and down reciprocating motion given to the screw rod K³ is irregular, that is, successive throws vary according to the action of the auxiliary cam device controlling the sleeve O′ carrying the main cam O. By this arrangement the convolutions of the thread wound on the quill H′ at the ends of the up and down strokes of the eye J are interlocked or bound on each other and in doing so prevent the thread from sloughing when the filled quills are subsequently used in a loom shuttle. By counterbalancing the feed member K and the thread delivery device by the use of the spring U⁴, as previously mentioned, the feed member K is not liable to injure the thread during the time of the contact between the peripheral face of the feed member K and the thread, as above explained. By using the tension spools I and I′ a uniform tension is given to the thread H to insure a uniform spooling of the thread on the quill so that the spooling is of the same hardness or uniformity of winding from start to finish. It is understood that by the arrangement described the spindle C can be run at a very high rate of speed (from 4,000 to 5,000) and as the spooling is automatic it requires no highly skilled attendant for running the machine.

In the foregoing use is made of the term "quill" but it is evident that the part referred to may be in the nature of a spool, bobbin or similar device.

Having thus described my invention, I claim as new and desire to secure by Letters Patent:

1. A spooling machine provided with a feeding and thread delivery device for delivering a thread to a revoluble spindle carrying quill, comprising a screw rod having a reciprocating up and down movement and arranged adjacent to and parallel with the said spindle, a feed member slidable on the said screw rod and having a feed nut engaging the said screw rod, a thread carrier moving with the said feed member for delivering a thread to the said quill, the said feed member being adapted to contact with the last layer of the thread on the quill at the time the feed member reaches the end of its return movement, and overbalancing means for the said feed member operating with and controlling said feed member at all times.

2. A spooling machine provided with a feeding and thread delivery device for feeding a thread to a revoluble spindle carrying a quill, comprising a screw rod extending parallel to the said spindle, means for imparting a reciprocating movement to the said screw rod in the direction of the length thereof, a feed member in the form of an inverted frustum of a cone and slidable on the said screw rod, a half nut held on the said member and engaging the said screw rod, a sleeve held centrally on the said feed member and provided with a collar, an arm engaging the said collar, a thread guide supported on the said arm and adapted to guide a thread to the quill on the said spindle, and a spring-pressed rod attached to the said arm to overbalance the said feed member.

3. A spooling machine provided with a feeding and thread delivery device for feeding a thread to a revoluble spindle carrying a quill, comprising a screw rod extending parallel to the said spindle, means for imparting a reciprocating movement to the said screw rod in the direction of the length thereof, a feed member in the form of an inverted frustum of a cone and slidable on the said screw rod, a half nut held on the said member and engaging the said screw rod, the said half nut being formed on a spring-pressed lever fulcrumed on the said feed member, a sleeve held centrally on the said feed member and provided with a collar and with a cut out portion in which the lever has a limited movement, an arm engaging the said collar, a thread guide supported on the said arm and adapted to guide a thread to the quill on the said spindle and a spring device for overbalancing the feed member.

4. A spooling machine provided with a feeding and thread delivery device for delivering a thread to a revoluble spindle carrying a quill, comprising a screw rod extending parallel to the said spindle, means for reciprocating the said screw rod in the direction of its length, a feed member of conical shape and provided with a bushing, a spring-pressed lever fulcrumed on the said feed member and engaging the said screw rod, a sleeve held adjustably in the said bushing and provided with a grooved collar, the said screw rod extending loosely through the said sleeve, an arm engaging the groove in the said collar, a second sleeve held adjustably in the said arm, and a thread guide adjustably secured on the said second sleeve.

5. A spooling machine provided with a thread delivery device for feeding a thread to a revolving spindle carrying a quill, a rock shaft having an arm connected with the said delivery device for reciprocating the same, the said rock shaft also having a depending arm, a reciprocating slide engaging the said depending arm, a revoluble main cam engaging the said slide to impart a reciprocating motion to the same, means for imparting a rotary motion to the said cam, and means for imparting a bodily sliding motion to the said cam in the direction of its axis.

6. A spooling machine provided with a thread delivery device for feeding a thread to a revolving spindle carrying a quill, a rock shaft having an arm connected with the said delivery device for reciprocating the same, the said rock shaft also having a depending arm, a reciprocating slide engaging the said depending arm, a revoluble main cam engaging the said slide to impart a reciprocating motion to the same, a sleeve carrying the said cam, means for revolving the said sleeve, a counter-shaft driven from the said sleeve, and an auxiliary cam driven from the said counter-shaft and engaging the said sleeve to shift the latter in the direction of its length.

7. A spooling machine provided with a thread delivery device for feeding a thread to a revolving spindle carrying a quill, a rock shaft having an arm connected with the said delivery device for reciprocating the same, the said rock shaft also having a depending arm, a reciprocating slide engaging the said depending arm, a revoluble main cam engaging the said slide to impart a reciprocating motion to the same, a sleeve carrying the said cam, means for revolving the said sleeve, a counter-shaft driven from the said sleeve, an auxiliary cam driven from the said counter-shaft and engaging the said sleeve to shift the latter in the direction of its length, and a spring pressing the said slide to hold the latter in engagement with the said main cam.

8. A spooling machine provided with a thread delivery device for feeding a thread to a revolving spindle carrying a quill, a rock shaft having an arm connected with the said delivery device for reciprocating the same, the said rock shaft also having a depending arm, a reciprocating slide engaging the said depending arm, a revoluble main cam engaging the said slide to impart a reciprocating motion to the same, a sleeve carrying the said cam, means for revolving the said sleeve, a counter-shaft driven from the said sleeve, an auxiliary cam driven from the said counter-shaft and engaging the said sleeve to shift the latter in the direction of its length, and a spring pressing the said sleeve to hold the latter in engagement with the said auxiliary cam.

9. A spooling machine provided with a thread delivery device for feeding a thread to a revolving spindle carrying a quill, a rock shaft having an arm connected with the said delivery device for reciprocating the same, the said rock shaft also having a depending arm, a reciprocating slide engaging the said depending arm, a revoluble main cam engaging the said slide to impart a reciprocating motion to the same, a sleeve carrying the said cam, means for revolving the said sleeve, a counter-shaft driven from the said sleeve, and an auxiliary cam driven from the said counter-shaft and engaging the said sleeve to shift the latter in the direction of its length, the said auxiliary cam having adjustable members to vary the throw of the auxiliary cam.

10. A spooling machine provided with a thread delivery device, a rock shaft connected with the said thread delivery device, a spring-pressed slide connected with the said rock shaft to rock the latter, a friction roller mounted on the said slide, a main cam engaged by the said friction roller, a sleeve carrying the said main cam, a support on which the said sleeve is mounted to turn and to slide in the direction of its length, a driven shaft, a worm and worm wheel connecting the said driven shaft with the said sleeve, a counter-shaft, a gearing connecting the said sleeve and the said counter-shaft with each other, an auxiliary cam, a gearing connecting the said counter-shaft with the said auxiliary cam, and a friction roller on the said sleeve and engaging the said auxiliary cam.

11. A spooling machine provided with a thread delivery device, a rock shaft connected with the said thread delivery device, a spring-pressed slide connected with the said rock shaft to rock the latter, a friction roller mounted on the said slide, a main cam engaged by the said friction roller, a sleeve carrying the said main cam, a support on which the said sleeve is mounted to turn and to slide in the direction of its length, a driven shaft, a worm and worm wheel connecting the said driven shaft with the said sleeve, a counter-shaft, a gearing connecting the said sleeve and the said counter-shaft with each other, an auxiliary cam, a gearing connecting the said counter-shaft with the said auxiliary cam, a friction roller on the said sleeve and engaging the said auxiliary cam, and a brake mechanism connected with the said counter-shaft to take up the backlash of the said gearings.

12. A spooling machine provided with a thread delivery device, a rock shaft connected with the said thread delivery device, a spring-pressed slide connected with the said rock shaft to rock the latter, a friction roller mounted on the said slide, a main cam engaged by the said friction roller, a sleeve carrying the said main cam, a support on which the said sleeve is mounted to turn and to slide in the direction of its length, a driven shaft, a worm and worm wheel connecting the said driven shaft with the said sleeve, a counter-shaft, a gearing connecting the said sleeve and the said counter-shaft with each other, an auxiliary cam, a gearing connecting the said counter-shaft with the said auxiliary cam, a friction roller on the said sleeve and engaging the said auxiliary cam, a spring pressing the said slide, and a spring pressing the said sleeve.

13. A spooling machine provided with feed mechanism and a thread delivery device supported by the said feed mechanism, the latter having a reciprocating screw rod, a feed member, a sleeve held adjustable in the said feed member and carrying the said thread delivery device, the sleeve having a cut-out portion, and a spring-pressed lever having a half nut engaging the said screw rod, the said lever extending through and working in the said cut-out portion and the said cut out portion having one side wall forming a stop to limit movement of the lever toward the screw rod.

In testimony whereof I have signed my name to this specification in the presence of two subscribing witnesses.

FREDERICK L. ATHERTON.

Witnesses:
 CORNELIUS VEENSTRA,
 ALBERT E. GOINSHAW.